United States Patent [19]

Shimada et al.

[11] 4,081,847
[45] Mar. 28, 1978

[54] ROTARY HEAD ASSEMBLY

[75] Inventors: Osamu Shimada; Katsumasa Takahashi, both of Tokyo, Japan

[73] Assignee: Sony Corporation, Tokyo, Japan

[21] Appl. No.: 675,462

[22] Filed: Apr. 9, 1976

[30] Foreign Application Priority Data

Apr. 14, 1975 Japan .................................. 50-45036

[51] Int. Cl.² .......................... G11B 5/52; G11B 21/18
[52] U.S. Cl. ........................................ 360/107; 360/84
[58] Field of Search .................. 360/107, 84, 105, 109, 360/102–103

[56] References Cited

U.S. PATENT DOCUMENTS

| 2,856,463 | 10/1958 | Lyon | 360/107 |
| 3,076,060 | 1/1963 | Horstkorta | 360/107 |
| 3,107,280 | 10/1963 | Suetsugu | 360/107 |
| 3,401,236 | 9/1968 | Narama | 360/107 |
| 3,673,347 | 6/1972 | Schoenmakers | 360/107 |
| 3,775,567 | 11/1973 | Bruck | 360/107 |

Primary Examiner—Alfred H. Eddleman
Attorney, Agent, or Firm—Lewis H. Eslinger; Alvin Sinderbrand

[57] ABSTRACT

A rotary head assembly, for example, for recording and/or reproducing video signals on a recording tape which is wrapped about at least a portion of the circumference of a tape guide drum, includes a primary support member moved in a circular path which is concentric with the guide drum, an intermediate support member, a first spring or springs connecting the primary and intermediate support members for yieldably resisting centrifugal movement of the intermediate support member relative to the primary support member, and a recording and/or reproducing head member or transducer connected to the intermediate support member by a second spring or springs providing the head member with a natural frequency of movement relative to the intermediate support member which is suitable to cause the head member to follow high frequency vibration of the tape and to reduce hunching of the latter at the location where the head member first contacts the tape, and which is substantially greater than the natural frequency of the centrifugal movement of the intermediate support member relative to the primary support member so that such centrifugal movement can ensure the adequate contact of the head member with the tape in response to movement of the primary support member in its circular path.

11 Claims, 7 Drawing Figures

4,081,847

ROTARY HEAD ASSEMBLY

BACKGROUND OF THE INVENTION

1. Field of the Invention

This invention relates generally to a rotary head assembly and, more particularly, is directed to an improved rotary head assembly for recording and/or reproducing video or other information signals on magnetic recording tape which is wrapped about at least a portion of the circumference of a tape guide drum with which the rotary head assembly is associated.

2. Description of the Prior Art

It has been proposed, for example, in U.S. Pat. No. 3,673,347, British patent specification No. 919,436, and U.S. patent application Ser. No. 566,539 filed Apr. 9, 1975, now U.S. Pat. No. 3,994,018, and having a common assignee herewith, to provide a rotary head assembly associated with a tape guide drum in a video signal recording and/or reproducing apparatus, as aforesaid, in which the head member of transducer is movable generally in the radial direction in respect to the circumference of the tape guide drum, and the centrifugal movement of the head member or transducer is yieldably resisted by a spring or springs with a view to ensuring adequate contact of the head member or transducer with the surface of the tape wrapped about the guide drum in response to the movement of the rotary head assembly in a circular path concentric with the guide drum. It will be apparent that, in the foregoing rotary head assemblies according to the prior art, the mass of the head member or transducer and of the supporting structure movable radially therewith and the characteristics of the spring or springs which yieldably resist the centrifugal or radially outward movement of such mass provide the latter with a predetermined natural frequency of oscillating movement in the radial direction. If the spring characteristics are selected to ensure that the centrifugal force acting to move the head member or transducer radially outward against the tape wrapped about the guide drum will provide an adequate contact pressure of the head member or transducer against the tape, then the natural frequency of oscillating movement will have a relatively low value. However, during recording and reproducing operations, a high frequency vibration is set up in the magnetic tape and the head member or transducer is incapable of following such high frequency vibration of the tape if it is urged against the tape by a spring or springs providing a relatively low natural frequency for the oscillatory movement of the head member or transducer in the radial direction. Furthermore, there is a tendency for the tape to hunch up at the point on the circumference of the tape guide drum where the head member or transducer first contacts the tape during each revolution of the rotary head assembly. Thus, in order to reduce such hunching of the tape, and further to ensure that the head member or transducer will follow the high frequency vibration of the tape and thereby avoid signal dropout during a recording or reproducing operation, it is desirable that the resilient mounting for the head member or transducer provide the latter with a relatively high natural frequency of oscillatory movement in the radial direction, but a spring or springs with characteristics sufficient to provide such high natural frequency will also strongly resist radially outward movement of the head member or transducer under the influence of centrifugal force and thus provide an inadequate contact pressure of the head member or transducer against the tape. Therefore, in the previously existing rotary head assemblies having a resiliently mounted head member or transducer, it has not been possible to provide the resilient mounting with the characteristics necessary for attaining all of the desired conditions for recording or reproducing operations.

OBJECTS AND SUMMARY OF THE INVENTION

Accordingly, it is an object of the present invention to provide an improved rotary head assembly which avoids the above described disadvantages of the existing resiliently mounted head members or transducers.

More specifically, it is an object of this invention to provide a rotary head assembly in which a head member or transducer thereof is mounted for oscillatory movement in the radial direction with such oscillatory movement being constrained by an arrangement of springs that permits centrifugal force to urge the head member or transducer with an adequate contact pressure against the magnetic tape, while the head member or transducer is capable of closely following high frequency vibrations induced in the tape and of reducing the hunching-up of the tape at the point of initial contact of the head member or transducer therewith.

Another object is to provide a rotary head assembly, as aforesaid, in which the resilient mounting of the head member or transducer is comprised of first and second resilient systems which, in effect, are connected in seires and dimensioned to respectively have relatively low and high natural frequencies of oscillation in the radial direction so that the first resilient system having a low natural frequency of oscillation permits centrifugal force to urge the head member or transducer against the tape with an adequate contact pressure, while the second resilient system having a relatively high natural frequency of oscillation ensures that the head member or transducer will closely follow high frequency vibrations of the tape and will reduce the previousy mentioned hunching-up of the tape.

In accordance with an aspect of this invention, a rotary head assembly includes a primary support member moved in a circular path which is concentric with the guide drum, an intermediate support member preferably having a relatively large mass in respect to the mass of the head member or transducer, a first spring or springs connecting the primary and intermediate support members for yieldably resisting centrifugal movement of the intermediate support member relative to the primary support member, and a second spring or springs connecting or mounting the head member or transducer in respect to the intermediate support member and providing the head member or transducer with a natural frequency of oscillating movement relative to the intermediate support member which is substantially greater than the natural frequency of the centrifugal movement of the intermediate support member relative to the primary support member as determined by the mass of the intermediate support member and the characteristics of the first spring or springs. Thus, in the rotary head assembly according to the invention, the aforesaid first spring or springs may be dimensioned to ensure that centrifugal force will provide an adequate contact pressure of the head member or transducer against the magnetic tape wrapped about the tape guide drum, while the second spring or springs may be dimensioned to ensure that the head member or transducer will closely follow high frequency vibrations of the tape and further to ensure that hunching-up of the tape at the point of the initial contact of the head member or transducer therewith will be reduced.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figure 1:
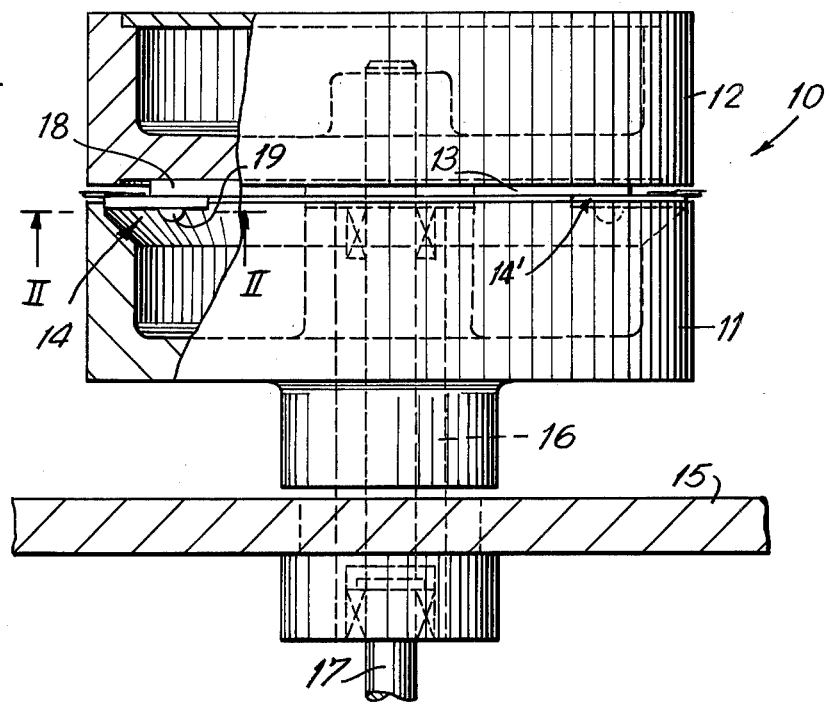
FIG. 1 is a side elevational view, partly broken away and in section, of a video recording and/or reproducing apparatus of a type in which the rotary head assembly according to this invention may be employed.

Referring to the drawings in detail, and initially to FIG. 1 thereof, it will be seen that, in a video recording and/or reproducing apparatus of a type to which the present invention may be applied, a tape guide drum 10 is provided which includes a lower portion 11 and an upper portion 12 spaced axially from lower portion 11 to define a circumferential slot or gap 13 therebetween. A magnetic tape (not shown) is helically wrapped about at least a portion of the periphery of drum 10 so that the plane of slot 13 will extend obliquely across the tape. A pair of substantially diametrically opposed rotary head assemblies 14 and 14' are associated with tape guide drum 10 so as to extend through slot 13 and thereby scan successive parallel record tracks extending obliquely across the tape wrapped about the periphery of the drum 10 and being suitably longitudinally advanced as the head assemblies are moved in a circular path which is concentric with drum 10. In the tape drum 10, as shown, the lower drum portion 11 may be fixedly mounted on a chassis 15 and contain a bearing assembly 16 in which a vertical shaft 17 is suitably journalled. The shaft 17 has its upper end portion projecting above lower drum portion 11 and suitably secured to upper drum portion 12 so that the latter will rotate with shaft 17 when such shaft is driven by a suitable drive source, such as, an electric motor (not shown). The rotary head assemblies 14 and 14' may be mounted at the opposite ends of a support bar 18 which extends diametrically across the undersurface of drum portion 12 and is secured to the latter, as by screws 19 indicated on FIG. 2, so that support bar 18 will be rotated with upper drum portion 12 for moving the rotary head assemblies 14 and 14' in a circular path.

Figure 2:
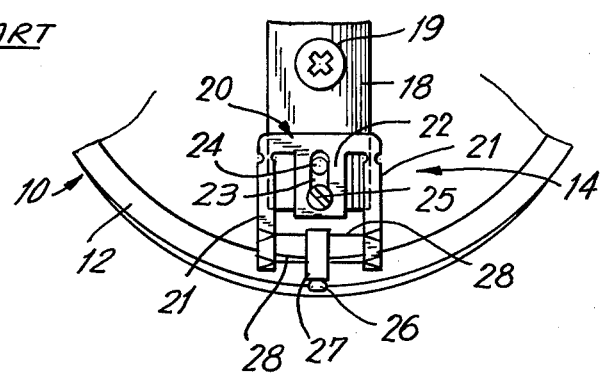
FIG. 2 is a fragmentary sectional view taken along the line II—II on FIG. 1, and showing an existing rotary head assembly.

Referring now to FIG. 2, it will be seen that each of the head assemblies 14 and 14' associated with the drum 10 on FIG. 1 may, in accordance with an existing arrangement as disclosed in detail in U.S. patent application Ser. No. 566,539, filed Apr. 9, 1975, and having a common assignee herewith, comprise a generally U-shaped frame 20 having radially outward directed arms 21 and a central portion 22. In order to mount frame 20 on the respective end portion of support bar 18, the central portion 22 of the frame has a longitudinal slot 23 which slidably receives a locating pin 24 depending from support bar 18, and a screw 25 also extends through a slot 23 into a tapped hole which is formed in bar 18 at a location spaced radially outward from pin 24. It will be apparent that the described mounting of frame 20 on support bar 18 permits adjustment of the frame in the radial direction in respect to the periphery of drum 10.

The existing rotary head assembly 14 is further shown to include a magnetic head chip or transducer 26 extending radially outward from a mounting plate 27 which is disposed between the free end portions of frame arms 21. The mounting plate 27 is resiliently supported in respect to frame 20, for example, by resilient or spring wires 28 which extend between frame arms 21 and are secured, at their middle portions, to mounting plate 27. The frame 20 of each of the head assemblies 14 and 14' is adjustably positioned in respect to support bar 18 so that, when the apparatus is at rest, the respective head chip or transducer 26 will be spaced slightly, in the radially inward direction, from the periphery of drum 10. However, during a recording or reproducing operation of the apparatus, that is, when head assemblies 14 and 14' are moved in a circular path in response to rotation of support bar 18 with drum portion 12, the centrifugal force acting on each mounting plate 27 and the respective head chip 26 causes radially outward movement thereof against the yieldable resistance of the resilient support wires 28 so that head chip or transducer 26 projects slightly beyond the periphery of guide drum 10 with a view to obtaining its smooth scanning contact with a tape wrapped about the guide drum.

Figure 3:
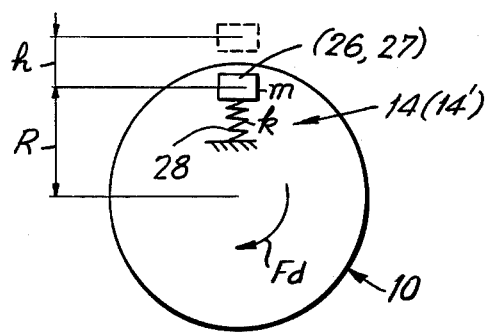
FIG. 3 is a diagrammatic view to which reference will be made in explaining a problem encountered in connection with the existing rotary head assembly of FIG. 2.

Referring now to FIG. 3, it will be seen that the head chip 26 and mounting plate 27 of each of the head assemblies 14 and 14' is there diagrammatically represented by the mass $m$ which is urged radially outward by centrifugal force in response to rotation of each head assembly about the axis of guide drum 10, and which has such radially outward movement resisted by the resilient wires 28 represented diagrammatically on FIG. 3 as a single spring having the elastic constant $k$ (g/mm). The natural frequency $Fn$ of the radially directed oscillatory movement of the mass $m$ is determined as follows:

$$Fn = (1/2\pi) \cdot (\sqrt{k}/m) \qquad (1)$$

From equation (1) above, it will be seen that the natural frequency $Fn$ is increased by either increasing the elastic constant $k$ of the spring or springs 28 and by decreasing the mass $m$ of the mounting plate 27 and the head chip 26 carried thereby. In order to permit the head chip or transducer 26 to closely follow the relatively high frequency vibrations induced in the recording tape during a recording or reproducing operation, it is desirable that the elastic constant $k$ and the mass $m$ be selected to provide a relatively large value for the natural frequency $Fn$.

Generally, the elastic constant $k$ of the spring of springs yieldably resisting centrifugal movement of head chip 26 and mounting plate 27 is determined as follows:

$$k = (m(R+h)(2\pi Fd)^2)/h \qquad (2)$$

in which $R$ is the radius (mm) of the circular path of movement of the mass $m$, $h$ is the radial distance (mm) through which the head chip 26 is to be shifted outwardly in response to the centrifugal force for obtaining contact of the head chip with the recording tape, and $Fd$ is the rotational speed (r.p.s. or Hz) of the head assembly 14 or 14'.

From equations (1) and (2) above, the following expression for the value of $h$ in terms of the natural frequency $Fn$ and the rotational speed $Fd$ can be obtained:

$$h = (Fd^2/Fn^2 - Fd^2) \cdot R \qquad (3)$$

The above equation (3) shows that the distance $h$ through which the head chip is moved radially outward by the centrifugal force is inversely proportional to the square of the natural frequency $Fn$. Thus, for example, if $Fd$ = 30Hz and $R$ = 45mm, the values of $h$ for various values of the natural frequency $Fn$ will be as indicated in the following table:

| Fn | 500Hz | 1KHz | 2KHz | 3KHz | 4KHz | 5KHz |
|---|---|---|---|---|---|---|
| h | 0.163 | 0.041 | 0.011 | 0.005 | 0.003 | 0.001 |

It has been found that, in order to achieve sufficient contact of the head chip with the tape during a recording or reproducing operation, the distance $h$ through which the head chip is moved radially outward by centrifugal force has to be approximately 0.150mm. Therefore, with the existing head assemblies 14 and 14', the resilient or spring wires 28 have to be selected to have an elastic constant $k$ which provides a natural frequency $Fn$ or no more than about 500Hz.

Figure 4:
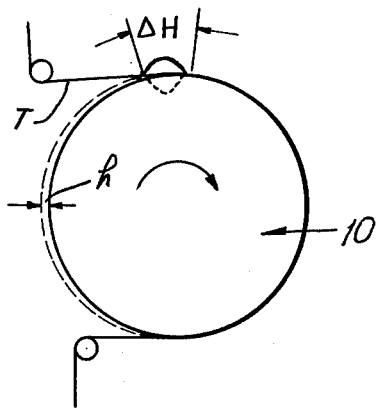
FIG. 4 is a diagrammatic view to which reference will be made in explaining another problem encountered with the existing rotary head assembly of FIG. 2.

Referring now to FIG. 4, it will be seen that, when the head chip or transducer projects the distance $h$ radially beyond the periphery of the tape guide drum 10, the tape T will vibrate away from the surface of the guide drum or hunch-up at the point on the guide drum periphery where the head chip or transducer first comes into contact with the tape during each revolution of the respective rotary head assembly. As is well known, when recording video signals with an apparatus of the type described above with reference to FIG. 1, there is a certain degree of overlapping of the video signals recorded in adjacent obliquely extending record tracks by the head assemblies 14 and 14'. That is, during the final increment of scanning movement of head assembly 14 along a record track on the tape, the other head assembly 14' has commenced its scanning movement along the next record track on the tape. Usually, such overlapping of the video signals recorded in adjacent tracks corresponds to approximately 3H to 10H, with H being the distance along each record track in which a horizontal or line interval of the video signal is recorded.

In order to avoid drop-out of the recorded signal at the beginning of each record track, the distance $\Delta H$ over which the tape is hunched-up by reason of the initial contact of the head chip or transducer therewith has to be made smaller than the distance along each record track in which the overlapping video signal is recorded. The distance $\Delta H$ along which the tape is hunched-up may be substantially obtained from the following equation:

$$\Delta H = (525/2Fn) \times Fd \qquad (4)$$

in which $\Delta H$ is a multiple of the distance H along a record track occupied by one horizontal or line interval of the recorded video signal.

From equation (4), it can be determined that, with $Fd$ = 30Hz, for example, various values of the natural frequency $Fn$ will result in respective values for $\Delta H$ as given in the below table:

| Fn | 500Hz | 1KHz | 2KHz | 3KHz | 4KHz | 5KHz |
|---|---|---|---|---|---|---|
| ΔH | 15.8H | 7.9H | 3.9H | 2.6H | 2.0H | 1.6H |

It will be apparent from the above table that, as the natural frequency $Fn$ is increased, the distance $\Delta H$ over which the tape is hunched-up is decreased. Furthermore, it is shown that, if $\Delta H$ is to have a value less than 3H in the case where the overlapping of the video signals in adjacent tracks may be as small as 3H, then the natural frequency $Fn$ can be no less than 3KHz.

From the foregoing, it will be seen that the value $Fn$ = 500Hz that has to be selected for ensuring that the head chip 26 of the existing head assembly 14 will project beyond the surface of guide drum 10 a sufficient distance $h$ to ensure adequate contact pressure of the head chip against the tape is inconsistent with the value $Fn$ = 3KHz that has to be provided for limiting the distance $\Delta H$ along which the tape is hunched-up to less than the distance 3H of the minimum overlap of the recorded video signals. Thus, in the existing rotary head assemblies having only a single resilient mounting system for the head chip 26, such resilient mounting system cannot be designed to satisfy all of the requirements for fully satisfactory recording and reproducing of video signals. In other words, if the resilient or spring wires 28 of the existing rotary head assemblies 14 and 14' are designed to provide a relatively low natural frequency $Fn$ for ensuring an adequate radially outward movement of the head chip by centrifugal force, such relatively low value of the natural frequency undesirably increases the distance over which the tape is hunched-up at the point of the initial contact of each head therewith.

Generally, in accordance with the present invention, the foregoing problem is overcome by providing a rotary head assembly in which the resilient mounting of the head chip or transducer is comprised of first and second resilient systems which, in effect, are connected in series and designed to respectively have relatively low and high natural frequencies of oscillation in the radial direction so that the first resilient system having a low natural frequency permits centrifugal force to urge the head chip or transducer to project a suitable distance beyond the periphery of the tape guide drum for adequate contact pressure with the tape thereon, while the second resilient system having a relatively high natural frequency ensures that the head chip or transducer will closely follow high frequency vibrations of the tape and will reduce the previously mentioned hunching-up of the tape so as to avoid dropout of the video signal being recorded or reproduced.

Figure 6:
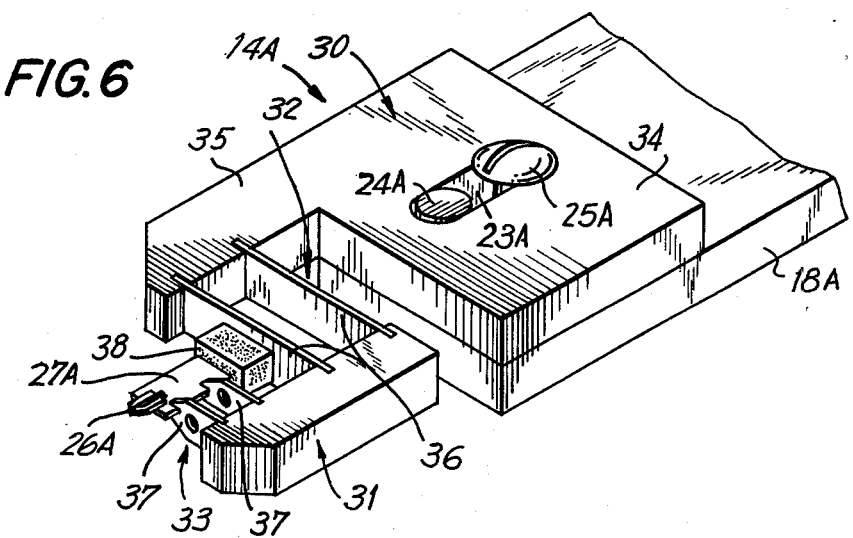
FIG. 6 is an enlarged perspective view illustrating a rotary head assembly according to one embodiment of this invention.

More specifically, as shown on FIG. 6, a rotary head assembly 14A according to one embodiment of this invention generally comprises a primary support member 30 which is adapted to be moved in a circular path, for example, by being mounted on a respective end portion of a rotary support bar 18A corresponding to the support bar 18 on FIG. 1; an intermediate support member 31 connected to the primary support member 30 by first resilient means 32 which yieldably resist centrifugal movement of the intermediate support member 31 relative to primary support member 30; and second resilient means 33 connecting the mounting plate 27A of head chip 26A with the intermediate support member 31 and providing the head chip 26A with a natural frequency of oscillatory movement in the radial direction relative to intermediate support member 31 which is substantially greater than the natural frequency of the centrifugal movement of intermediate support member 31 relative to primary support member 30 as determined by the first resilient means 32. More specifically, in the rotary head assembly 14A, as shown, primary support member 30 has a base portion 34 formed with a central longitudinal slot 23A receiving a guide pin 24A and a screw 25A for adjustably securing base portion 34 to the respective end portion of bar 18A. Primary support member 30 further has a radially outward directed arm 35 extending from one side of its base portion 34. The intermediate support member 31 is in the form of an elongated bar preferably having a mass substantially greater than the combined mass of head chip 26A of its mounting plate 27A and extending in the radial direction substantially in line with the side of base portion 34 which is remote from arm 35 so as to be in parallel spaced relation to the latter. The first resilient means 32 may be constituted by a pair of parallel, spaced apart leaf springs 36 extending laterally between, and having their opposite ends anchored in arm 35 and in the radially inner end portion of intermediate support member 31.

Further, in the embodiment of FIG. 6, the mounting plate 27A having head chip 26A extending from its radially outer end is disposed in parallel, spaced apart relation to the radially outer end of intermediate support member 31 at the side of the latter facing toward arm 35 of primary support member 30. The second resilient means 33 is constituted by a pair of parallel, spaced apart leaf springs 37 extending laterally between, and having their opposite ends suitably secured or anchored to intermediate support member 31 and mounting plate 27A. A damper 38 constituted by a block of resilient rubber, such as, butyl rubber, is interposed between, and suitably secured to the radially inner end of mounting plate 27A and the adjacent one of the leaf springs 36 for damping the oscillatory movement, in the radial direction, of mounting plate 27A and head chip 26A relative to intermediate support member 31.

As previously mentioned, the intermediate support member 31 preferably has a mass M very substantially larger than the mass $m$ of the mounting plate 27A and head chip 26A, and further, in accordance with this invention, the leaf springs 36 have a relatively small elastic constant K, while the leaf springs 37 have an elastic constant $k$ which is relatively large in comparison with that of the leaf springs 36.

Figure 5:
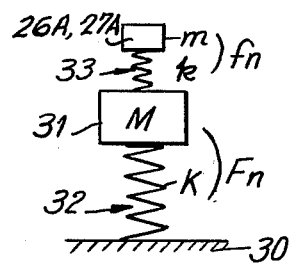
FIG. 5 is a diagrammatic view to which reference will be made in explaining the principle of operation of a rotary head assembly in accordance with this invention.

Thus, as shown diagrammatically on FIG. 5, the rotary head assembly 14A according to this invention provides a first oscillatory system consisting of the mass M of intermediate support member 31 and resilient means 32 having the elastic constant K, and a second oscillatory system which is arranged in series with the first oscillatory system and consists of the mass $m$ of head chip 26A and its mounting plate 27A and the resilient means 33 having the elastic constant $k$. Since $m << M$ and $k >> K$, the above mentioned first and second oscillatory systems can be provided with respective natural frequencies Fn and $fn$ satisfying the condition $Fn << $ Fn. In other words, Fn can be made to be approximately 500Hz, while $fn$ is made to be at least approximately 3KHz.

Thus, when the head assembly 14A according to this invention is moved in a circular path traced by the respective end portion of the rotated support bar 18A, the intermediate support member 31, and with it the mounting plate 27A and head chip 26A, is moved radially outward by centrifugal force acting on the relatively large mass M of intermediate support member 31 against the resistance of resilient means 32 so as to suitably project head chip 26A beyond the periphery of the associated tape guide drum for achieving the desired contact pressure of the head chip against the tape wrapped about the surface of such drum. While the mounting plate 27A and head chip 26A thereon are also urged radially outward by centrifugal force relative to intermediate support member 31 against the resistance of resilient means 33, the mass $m$ of mounting plate 27A and head chip 26A is so much smaller than the mass M of intermediate support member 31 that the effect of centrifugal force on the head chip and its mounting plate is negligible. Furthermore, the natural frequency $fn$ of the oscillatory movement of head chip 26A relative to intermediate support member 31 as determined by the relatively small value of the mass $m$ and the relatively large elastic constant $k$ of resilient means 33 ensures that head chip 26A will be able to follow relatively high frequency vibrations of the contacted tape, and further that the extent over which the tape is hunched-up, as described above with reference to FIG. 4, will be reduced to less than the distance along each record track where repeated or overlapped video signals are recorded. Accordingly, the head assembly 14A according to this invention is capable of satisfying all of the conditions required for the recording and reproducing of video signals without dropout.

Figure 7:
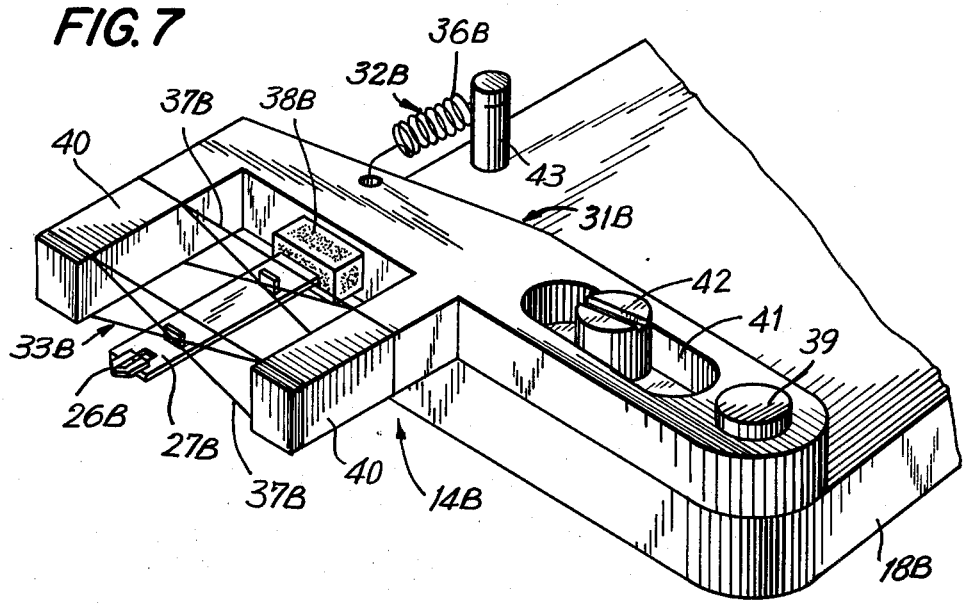
FIG. 7 is a perspective view illustrating a rotary head assembly according to another embodiment of this invention.

Referring now to FIG. 7, it will be seen that, in a rotary head assembly 14B according to another embodiment of this invention, the primary support member may be constituted by the respective end portion of the support bar 18B which rotates about the center of the associated tape guide drum (not shown), and that such head assembly 14B further comprises an intermediate support member 31B having a portion that is movable substantially radially in respect to the primary support member against the yieldable resistance of a first resilient means 32B, and a second resilient means 33B by which the mounting plate 27B carrying a head chip 26B is connected to the intermediate support member 31B. More specifically, the intermediate support member 31B is shown to be laterally elongated, and to be pivotally mounted, at one end, on a pivot pin 39 carried by the primary support member or bar 18B so that the opposite end portion of member 31B is movable substantially in the radial direction. Such opposite end portion of intermediate support member 31B is further shown to have a pair of parallel, spaced apart arms 40 directed radially outward therefrom, and a laterally elongated slot 41 is provided in intermediate support member 31B to loosely receive a stop element 42 which extends from primary support member 18B for limiting the pivotal movement of member 31B relative to member 18B. The first resilient means 32B of head assembly 14B is shown to consist of a helical tension spring 36B connected at one end to the free end portion of pivoted intermediate support member 31B, while the other end of spring 36B is anchored to a pin 43 secured to member 18B so that spring 36B yieldably resists the centrifugal or radially outward movement of the free end portion of intermediate support member 31B.

In the rotary head assembly 14B, as shown, mounting plate 27B for head chip 26B is disposed between arms 40 of intermediate support member 31B, and the second resilient means 33B is constituted by resilient or spring wires 37B which extend between arms 40 and, at locations midway between the latter, are soldered or otherwise suitably secured to mounting plate 27B. Finally, a damping member 38B of rubber or the like is mounted between the radially inner end of mounting plate 27B and an adjacent surface of intermediate support member 31B for damping the oscillatory radial movement of mounting plate 27B relative to intermediate support member 31B.

As in the previously described embodiment of this invention, in the rotary head assembly 14B, the mass of intermediate support member 31B and the elastic constant of spring 36B are selected so that the natural frequency of the oscillatory movement of intermediate support member 31B relative to primary support member 18B will have a relatively low value for ensuring that centrifugal force will provide an adequate contact pressure of head chip 26B with the tape wrapped about the associated tape guide drum, while the relatively low mass of mounting plate 27B and head chip 26B thereon and the elastic constant of the spring wires 37B are selected to provide a relatively high natural frequency for the oscillatory movement of head chip 26B relative to intermediate support member 31B for ensuring that the head chip will closely follow the relatively high frequency vibration of the tape and for reducing the distance over which the tape is hunched-up at the point where the head chip effects initial contact with the tape.

Although illustrative embodiments of the invention have been described in detail herein with reference to the accompanying drawings, it is to be understood that the invention is not limited to those precise embodiments and that various changes and modifications may be effected therein by one skilled in the art without departing from the scope or spirit of the invention as defined in the appended claims.

What is claimed is:

1. A rotary head assembly comprising a primary support member which is adapted to be moved in a circular path, an intermediate support member, first resilient means connecting said intermediate support member to said primary support member for yieldably resisting centrifugal movement of said intermediate support member relative to said primary support member and establishing a natural frequency therebetween, a head member for recording and/or reproducing an information signal, and second resilient means connecting said head member with said intermediate support member for providing said head member with a natural frequency of movement relative to said intermediate support member which is substantially greater than said natural frequency of said centrifugal movement of said intermediate support member relative to said primary support member.

2. A rotary head assembly according to claim 1; in which said intermediate support member has a mass that is relatively larger than the mass of said head member.

3. A rotary head assembly according to claim 1; further comprising damping means for damping said movement of the head member relative to said intermediate support member.

4. A rotary head assembly according to claim 1; in which said first resilient means includes a plurality of parallel first leaf springs connected at one end to said primary support member and at the other end to said intermediate support member so as to flex in response to said centrifugal movement of said intermediate support member.

5. A rotary head assembly according to claim 4; in which said second resilient means includes a plurality of parallel second leaf springs connected at one end to said head member and at the other end to said intermediate support member.

6. A rotary head assembly according to claim 5; in which said second leaf springs extend generally parallel to said first leaf springs.

7. A rotary head assembly according to claim 6; in which said primary support member had a radially outward directed arm, said intermediate support member extends substantially parallel to, and is spaced from said arm, said first leaf springs extend laterally between said arm and the radially inner end portion of said intermediate support member, said head member is disposed at the side of said intermediate support member facing toward said arm, and said second leaf springs extend laterally between the radially outer end portion of said intermediate support member and said head member.

8. A rotary head assembly according to claim 7; further comprising a damping member interposed between said head member and an adjacent one of said first leaf springs.

9. A rotary head assembly according to claim 1; in which said intermediate support member is pivotally mounted at one end on said primary support member so as to permit said centrifugal movement of the other end portion of said intermediate support member, said other end portion of the intermediate support member has parallel, spaced apart arms directed radially outward therefrom, said head member is disposed between said arms, and said second resilient means extends between said head member and said arms.

10. A rotary head assembly according to claim 9; in which said second resilient means includes a plurality of wire springs extending between said arms and secured at their middle portions to said head member.

11. A rotary head assembly according to claim 9; further comprising a damping member interposed between said head member and said other end portion of the intermediate support member.

* * * * *